United States Patent [19]
Yoon

[11] Patent Number: 5,625,264
[45] Date of Patent: Apr. 29, 1997

[54] SYSTEM FOR CONTROLLING A BRUSHLESS DC MOTOR

[75] Inventor: Sung-jung Yoon, Kyunggi-do, Rep. of Korea

[73] Assignee: Samsung Aerospace Industries, Ltd., Kyeongsangnam-do, Rep. of Korea

[21] Appl. No.: 377,431

[22] Filed: Jan. 24, 1995

[30] Foreign Application Priority Data

May 31, 1994 [KR] Rep. of Korea .................. 94-12091

[51] Int. Cl.$^6$ ................................. H02P 6/00
[52] U.S. Cl. ................ 318/254; 318/439; 318/610; 388/815; 388/906; 388/910
[58] Field of Search ................ 388/871–815, 388/906, 910; 318/604–610, 251, 439

[56] References Cited

U.S. PATENT DOCUMENTS

| | | | |
|---|---|---|---|
| 4,623,827 | 11/1986 | Ito | 388/811 |
| 4,733,144 | 3/1988 | Bisseling | 318/609 X |
| 4,831,317 | 5/1989 | Sakamoto et al. | 318/811 X |
| 5,023,924 | 6/1991 | Tajima et al. | 388/811 |
| 5,159,218 | 10/1992 | Murry et al. | 388/800 X |
| 5,384,526 | 1/1995 | Bennett | 318/609 X |
| 5,463,298 | 10/1995 | Kamio et al. | 378/811 X |

*Primary Examiner*—David S. Martin
*Attorney, Agent, or Firm*—Finnegan, Henderson, Farabow, Garrett & Dunner, L.L.P.

[57] ABSTRACT

A system for controlling a brushless DC motor which can minimize a torque ripple of a motor, thus reducing minute vibrations of the motor and loading devices and increasing efficiency. The system includes a current command generator for producing a current command signal by multiplying a wave form of the current command signal in correspondence to position information by the desired size of the current command signal; a current controller for controlling actual current in the motor to follow the current command signal produced from the current command generator, in response to a feedback error control signal having proportion, integral, and differential elements, and producing a signal for turning ON/OFF following the current command; and an inverter circuit for controlling switching elements to be turned ON/OFF by the signal produced from the current controller, and the desired amount of current to be applied to three-phase coils by a power supply unit. The proportional element is implemented by a sawtooth comparator; and dead time is selectively introduced to take advantage of the inertia of the motor.

9 Claims, 13 Drawing Sheets

SYSTEM FOR CONTROLLING A BRUSHLESS DC MOTOR

BACKGROUND OF THE INVENTION

1. Field of The Invention

The present invention relates generally to a system for controlling a brushless DC motor, and more particularly, to a system capable of minimizing a torque ripple.

2. Description of Related Art

Various kinds of motors are used as driving devices for industrial electrical devices, such as a video tape recorder or a color printer, for example, and automatic machinery and tools, such as a robot, a numerical control machine, and the like. Demand for such motors is rapidly increasing because of automation.

Motors are broadly classified as DC motors and AC motors. DC motors are generally used because they are easily controlled. However, a disadvantage of the DC motor is the necessity for replacing brushes periodically. Although an AC motor does not require brushes, it is difficult to control. Thus, it has not been used for industrial products of high accuracy. However, because control technique for the AC motor are greatly advanced due to the development of microprocessor and other electronic techniques, the AC motor is replacing the DC motor.

Specifically, brushless DC motors and synchronous AC motors are generally used in highly accurate servomechanisms. The brushless DC motor is advantageous in that production costs are low. However, because brushless DC motors are difficult to control, they have been generally used for automatic machinery and tools, and industrial electrical devices which do not require micro-precision accuracy.

First, the operating principle of the brushless DC motor is described with reference to FIG. 1. Construction of a three-phase brushless DC motor is similar to that of a synchronous AC motor. A rotor 13 consists of a permanent magnet having P pole pairs (one pair being shown). Coils 11 are wound in a stator iron core 12, and three-phase current is supplied through the coils 11.

When the rotor 13 of the permanent magnet is rotating at a speed D, a magnetic flux is generated. The magnetic flux cuts current flowing through the coils 11 of the stator, thereby generating a torque between the stator iron core 12 and the rotor 13 according to Ampère's Law (F=I×B). Arrows illustrated in the rotor 13 of FIG. 1 indicate the directions of the magnetic flux.

Secondly, a dynamic equation of the brushless DC motor is derived based upon the following assumptions of a three-phase brushless DC motor.

1) The motor operates in a linear area and a the hysteresis loss may be ignored.

2) A slit between the rotor and the stator is uniform compared to the radius of the rotor.

3) Mutual inductances among each phase are constant regardless of the position of the rotor.

Since phase voltage of the motor is the sum of the amount of voltage drop caused by resistance and a time derivative of the amount of magnetic flux interlinkage, an equation of the phase voltage can be expressed as follows:

$$V_k = r_k i_k + \frac{d\lambda_k}{dt}, k=1,2,3 \quad (1)$$

where $V_k$ is the input voltage to the phase, $i_k$ is the phase current, $r_k$ is phase resistance and $\lambda_k$ is the magnetic flux.

The interlinked magnetic flux of one phase is classified into a magnetic flux produced by current flowing in the phase, a magnetic flux interlinked by current of the other phase and a magnetic flux interlinked by the rotor of the permanent magnet, and the motor is operated in the linear area (Assumption 1). The magnetic flux $\lambda_k$ can be obtained as follows;

$$\lambda_k = \sum_{j=1}^{3} L_{jk} i_j + \lambda_{mk}, k=1,2,3 \quad (2)$$

where $L_{jk}$ is a mutual inductance between phases j and k, $L_{kk}$ is a self-inductance, and $\lambda_{mk}$ is the interlinkage number of the magnetic flux between the rotor and a phase, k.

If the equation (2) is substituted into the equation (1), $$V_k = r_k i_k + \sum_{j=1}^{3} L_{jk} \frac{di_j}{dt} + \frac{d\lambda_{mk}}{d\theta} \frac{d\theta}{dt}, k=1,2,3 \quad (3)$$

where $\theta$ is a position of the rotor.

The last term in the right-hand side of the equation (3) corresponds to the reverse electromotive force of the motor, and is the speed of the rotor multiplied by a position $\theta$ derivative of the interlinkage number of the magnetic flux interlinked by the rotor on the stator. Accordingly, most of voltage applied to the motor is cancelled by the reverse electromotive force, which has a large value at high speed, such that it is difficult to obtain current of a predetermined flow and thereby a desired torque can not be obtained.

The following may be defined according to condition (3).

$$r_k = R, k=1,2,3 \quad (4)$$
$$L_{jk} = M, j \neq k$$
$$L_{kk} = L_s, k=1,2,3$$
$$\frac{d\theta}{dt} = \omega, L_s - M = L$$

The position $\theta$ derivative of the interlinkage number of the magnetic flux interlinked by the rotor on the stator is a characteristic function of the motor, and since phases have phase differences by $2/3\pi$ from one another, the following definitions may be obtained.

$$\frac{d\lambda_{m1}(\theta)}{d\theta} = g(\theta) \quad (5)$$

$$\frac{d\lambda_{m2}(\theta)}{d\theta} = g(\theta - 2/3\pi)$$

$$\frac{d\lambda_{m3}(\theta)}{d\theta} = g(\theta + 2/3\pi)$$

Since three phases are connected in a Y line, the total of the current of the three phases becomes zero.

$$i_1 + i_2 + i_3 = 0 \quad (6)$$

According to the conditions, (3), (4), (5) and (6), a following equation (7) may be obtained.

$$v_1 = r_1 + L_{11}\frac{di_1}{dt} + L_{21}\frac{di_2}{dt} + L_{31}\frac{di_3}{dt} + \frac{d\lambda_{m1}(\theta)}{d\theta} \cdot \frac{d\theta}{dt} \quad (7)$$

$$= Ri_1 + L_s\frac{di_1}{dt} + M\left(\frac{di_2}{dt} + \frac{di_3}{dt}\right) + g(\theta)\omega$$

$$= Ri_1 + (L_s - M)\frac{di_1}{dt} + g(\theta)\omega$$

$$= Ri_1 + L\frac{di_1}{dt} + g(\theta)\omega$$

The equation (7) can be expressed for the three phases as follows;

$$L\frac{di_1}{dt} = -Ri_1 - g(\theta)\omega + v_1 \quad (8)$$

$$L\frac{di_1}{dt} = -Ri_1 - g(\theta)\omega + v_1$$

$$L\frac{di_2}{dt} = -Ri_2 - g(\theta - 2/3\pi)\omega + v_2$$

$$L\frac{di_3}{dt} = -Ri_3 - g(\theta + 2/3\pi)\omega + v_3$$

A coenergy relationship is introduced to calculate the torque generated by one phase.

$$W_c(i_k,\theta) = 1/2 i_{k2} L_{kk} + 1/2 \sum_{j=1}^{3} i_j i_k L_{jk} + i_k \lambda_{mk} \quad (9)$$

$$T_k = \frac{\partial W_c(i_k,\theta)}{\partial \theta} \quad (10)$$

$$= 1/2 i_{k2}\frac{dL_{kk}}{d\theta} + 1/2 \sum_{j=1}^{3} i_j i_k \frac{dL_{jk}}{d\theta} + i_k \frac{d\lambda_{mk}}{d\theta}$$

$$= i_k \frac{d\lambda_{mk}}{d\theta}$$

Referring to equation (10), the torque generated by one phase is the characteristic function $g(\theta)$ of the motor multiplied by the phase current. Since the entire torque T is the total of $T_1$, $T_2$ and $T_3$, an equation (11) may be obtained according to equations (5) and (10).

$$T = T_1 + T_2 + T_3 = g(\theta)i_1 + g(\theta - 2/3\pi)i_2 + g(\theta + 2/3\pi)i_3 \quad (11)$$

$g(\theta)$ in the equation (11) is the characteristic function, and may have a trapezoidal wave form or a sinusoidal wave form or a quasi-sinusoidal wave form. Accordingly, the user should obtain a suitable current command according to the wave form of $g(\theta)$ to generate the desired torque, and make the actual current follow a current command by adjusting the phase voltage since the actual current is controlled by a dynamic equation shown in the equation (8). Referring to the equation (11), the torque is expressed by the function of $\theta$, and also the current command should be the function of $\theta$ to obtain the torque free of $\theta$.

The dynamic equation for a mechanical part is expressed as the following equation (12), and J corresponds to a moment of intertia of the motor and B to a frictional coefficient of the motor.

$$Jd\omega/dt + B = T - T_L\omega \quad (12)$$

Third, a mathematical model of the brushless DC motor based on the equations (8) and (11) is shown in FIG. 2.

Fourth, a method for controlling the torque of the conventional brushless DC motor—derivation of the current command for minimizing the torque ripple—is as follows.

The dynamic equation of the brushless DC motor is as follows:

$$L\frac{di_1}{dt} = -Ri_1 - g(\theta)\omega + v_1 \quad (13)$$

$$L\frac{di_2}{dt} = -Ri_2 - g(\theta - 2/3\pi)\omega + v_2 \quad (14)$$

$$L\frac{di_3}{dt} = -Ri_3 - g(\theta + 2/3\pi)\omega + v_3 \quad (15)$$

$$T = g(\theta)i_1 + g(\theta - 2/3\pi)i_2 + g(\theta + 2/3\pi)i_3 \quad (16)$$

Referring to the equation (16), the torque is the function of $\theta$ as well as of the current. Since the term of $g(\theta)$ is the characteristic function of the motor, the phase current should be controlled to generate the desired torque.

To make the phase current directly proportional to the current, as in the conventional DC motor, the user should obtain the current command which makes the torque free of $\theta$ under the assumption that the actual current perfectly follows the current command according to the operation of a current controller.

An equation (17) obtains the current command, which makes the torque proportional to the current as follows: $i_M^*(t)$ is a torque command produced from the speed controller, $f_k(\theta)$ is a wave form of the current command which makes the torque free of $\theta$, that is, without a ripple.

$$i_1^*(i_M^*,\theta) = i_M^*(t)f_1(\theta)$$

$$i_2^*(i_M^*,\theta) = i_M^*(t)f_2(\theta)$$

$$i_3^*(i_M^*,\theta) = i_M^*(t)f_3(\theta) \quad (17)$$

Torque may be obtained by substituting the equation (17) into the equation (16) if the phase current governed by the equations (13), (14) and (15) perfectly follows the current command expressed in the equation (17) according to the operation of the current controller.

$$T(i_M^*,\theta) = i_M^*[f_1(\theta)g(\theta) + f_2(\theta)g(\theta - 2/3\pi) + f_3(\theta)g(\theta + 2/3\pi)] \quad (18)$$

If the equation (19) is satisfied, the torque ripple $\theta$ does not exist since the torque is proportional to the current, and the torque is the function of only $i_M^*$.

$$f_1(\theta)g(\theta) + f_2(\theta)g(\theta - 2/3\pi) + f_3(\theta)g(\theta + 2/3\pi) = k \quad (19)$$

Then, $f_k(\theta)$, satisfying the equation (19) for the $g(\theta)$, will be obtained. If the $g(\theta)$ has the trapezoidal wave form, it has a similar area to a linear area. When the current command is zero in the linear area and constant in a constant area, the torque ripple does not exist.

$$g(\theta) = \begin{cases} M, & \pi/6 \leq \theta \leq 5\pi/6 \\ -M, & 7\pi/6 \leq \theta \leq 11\pi/6 \end{cases} \quad (20)$$

Lastly, $f_k(\theta)$ satisfying the equation (19) may expressed as an equation (21), and have a spherical wave as shown in FIGS. 3A–3C.

$$f_1(\theta) = \begin{cases} 1, & \pi/6 \leq \theta \leq 5\pi/6 \\ -1, & 7\pi/6 \leq \theta \leq 11\pi/6 \\ 0, & \text{in the other cases} \end{cases} \quad (21)$$

$$f_2(\theta) = f_1(\theta - 2/3\pi)$$
$$f_3(\theta) = f_1(\theta + 2/3\pi)$$

Then, $$f_1(\theta)g(\theta)+f_2(\theta)g(\theta-2/3\pi)+f_3(\theta)g(\theta+2/3\pi)]=2M \quad (22)$$

When the actual current perfectly follows the current command of the spherical wave, as a result, the torque is made to be proportionate to $i_M^*(t)$.

$$T=2Mi_M^*(t) \quad (23)$$

A Korean Examined Application No. 93-4030 entitled "A Method For Improving A Torque Ripple Of A Brushless DC Motor" published on May 19, 1994, proposes overcoming the torque ripple of a brushless DC motor.

In the above publication a method for driving the linear voltage which allows a slight tilt at a point of turning ON/OFF, is proposed. The above-identified disclosure proposes to overcome the problems and disadvantages of a conventional method for driving a constant current, so that optimal current may flow to improve the torque ripple. This is carried out by controlling an electrothermosensitive angle and the tilt at the time of turning ON/OFF, namely, a slew rate of an active amplifier in an inverter terminal to maximize an average torque as much as possible after minimizing the current in the method for driving linear voltage and rotating a torque pulsating exponent to a minimum.

However, the above publication is for minimizing the harmonics of the output current, and the relationship between the output current and an output torque is not clearly disclosed.

Since the output torque is a multiplication of the reverse electromotive force and the output current, the ripple is not removed even though the harmonics of the output current is reduced. A certain restriction needs to be made to the wave form of the reverse electromotive force to remove the ripple.

In addition, in the above-identified publication, the method which controls the slew rate of the amplifier in the inverter terminal to apply the current command is approximate. A more exact method for controlling current is required.

A conventional circuit for controlling the torque and inverter is illustrated in FIG. 4.

Referring to FIGS. 5A–5C, current of iM*, –iM* flows in two phases at every range of π/6, and current does not flow in the third phase. Accordingly, it is preferable for current among each line to flow in the amount of iM* uniformly.

For example, the current between each line from phase a, to phase between 0 and π/6, is made to be $i_M^*$. The current command in the phase c, is zero, and it is preferable to modify a winding rather than to control the current command in the phase c.

Each unit in a torque control circuit and an inverter circuit has the following role.

1) A derotator circulates current of one phase among three phases according to the position of the rotor.

2) An error amplifier amplifies a current error signal.

3) A PWM amplifier converts the amplified error signal into a pulse width modulation signal.

4) A rotator supplies BUS voltage and -BUS voltage between each line of two phases to be controlled by the PWM signal, and breaks down the wire of the third phase.

5) A commutation logic receives information about position of the rotor and selects two phases to be controlled.

A high gain controller is used as the current controller, and FIG. 7 is a block diagram generally illustrating the system for controlling the brushless DC motor including the position and speed controllers.

A transfer function between $i_1^*$, $i_1$ will be gained as follows when the reverse electromotive force $g(\theta)\omega$ is ignored.

$$\frac{I_1^*(S)}{I_1(S)} = \frac{K}{L_s + R + K} \quad (24)$$

Then, a bandwidth of a control loop becomes (R+K)/L. However, since the current command $i_1^*$ has the spherical wave form and has an infinite frequency component, K should be infinite in order that $i_1$ follows $i_1^*$. However, an infinite K is impossible. The actual current is shown in FIGS. 6A–6D, and the torque ripple is produced six times for each rotation due to the current control error.

Since the reverse electromotive force $g(\theta)\omega$ becomes greater and the voltage offset by input voltage $v_1$ for controlling current is applied to the motor, the efficiency of controlling the current is reduced and the frequency of torque ripple becomes high when the motor is rotated at a high speed.

Since the torque ripple is produced six times for each rotation, it can be expanded in Fourier series as shown in the following equation (25).

$$T(\theta t) \sum_{n=1}^{\infty} T_{6n}\cos(6\theta t) \quad (25)$$

Since the frequency of the ripple becomes high and is filtered in a low pass filter, by inertia of the motor when rotated at a high speed, the problem is minor. However, since the frequency of the ripple is represented as a speed ripple, there is a problem in that the speed control is not exact when the motor is rotated at a low-speed.

Since the current command is a spherical wave, a discontinuous function, the actual current does not closely follow the command. Thus, the torque ripple is produced in the conventional torque controlling method.

In light of the foregoing, there is a need to provide a system for controlling a brushless DC motor that overcomes the problems and disadvantages of the conventional devices.

SUMMARY OF THE INVENTION

Accordingly, the present invention is directed to a system for controlling a brushless DC motor that substantially obviates one or more of the problems due to limitations and disadvantages of the related art.

The features and advantages of the invention will be set forth in the description which follows, and in part will be apparent from the description, or may be learned by practice of the invention. The objectives and other advantages of the invention will be realized and attained by the apparatus and method particularly pointed out in the written description and claims hereof as well as the appended drawings.

To achieve these and other advantages, and in accordance with the purpose of the invention, as embodied and broadly described, the invention is a system for controlling a brushless DC motor that includes means for producing a current command signal by multiplying (1) data representing a waveform of the current command signal in one-to-one correspondence with position information by (2) a selected peak an amplitude of the current command, and means for controlling actual current in the motor to follow the current command signal produced from said controlling means by a feedback correction signal including proportional, integral, and differential elements the feedback error correction signal having a level for turning current ON or OFF, including a sawtooth comparator providing the proportional element as a relatively high-gain element, and including a mechanism providing dead time in the feedback error correction signal of an amount such that some high frequency ripple is not responded to in the error correction signal; and means for controlling switching elements to be turned ON/OFF by the feedback error correction signal produced by the actual current controlling means and for passing the desired amount of current to be applied to three-phase coils by a power supply unit.

It is to be understood that both the foregoing general description and the following detailed description are exemplary and explanatory and are intended to provide further explanation of the invention as claimed.

The accompanying drawings, which are incorporated in and constitute a part of this specification, illustrate exemplary embodiments of the invention and together with the description, serve to explain the principles of the invention.

DETAILED DESCRIPTION OF THE PREFERRED EMBODIMENTS

Figure 1:
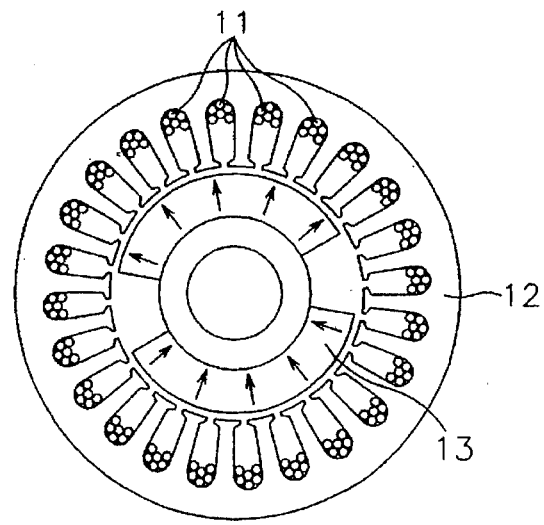
FIG. 1 is a sectional view illustrating a construction of a conventional brushless DC motor.
Figure 2:
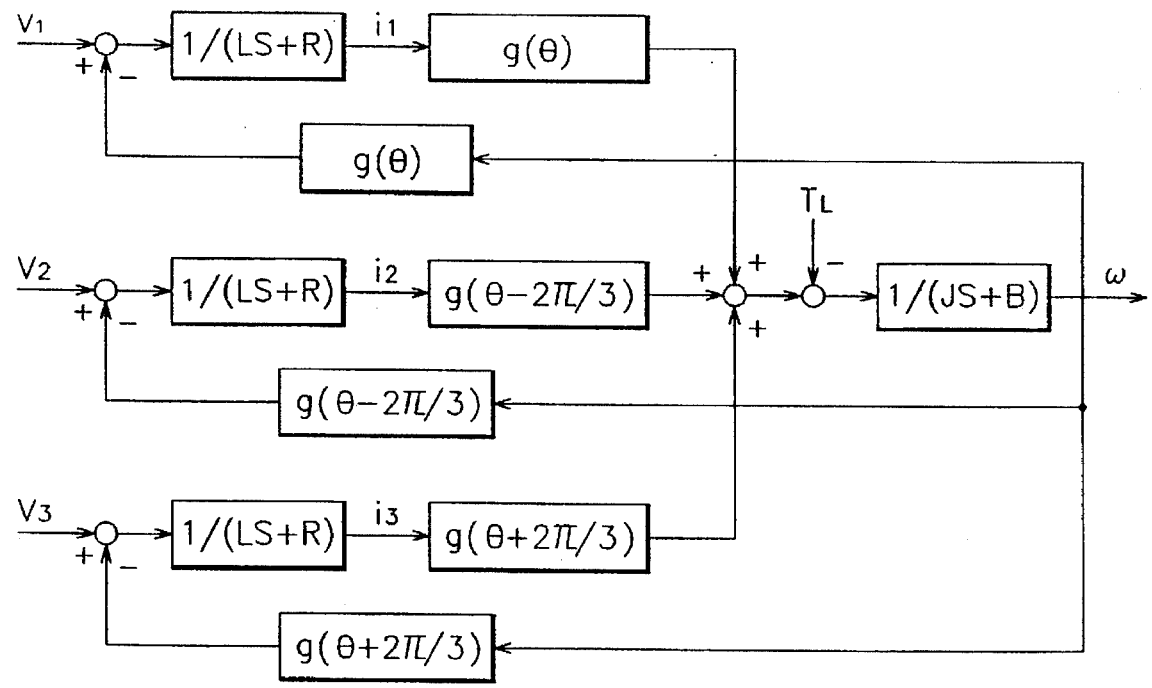
FIG. 2 is a block diagram illustrating a mathematical model of a brushless DC motor.
Figure 3A:
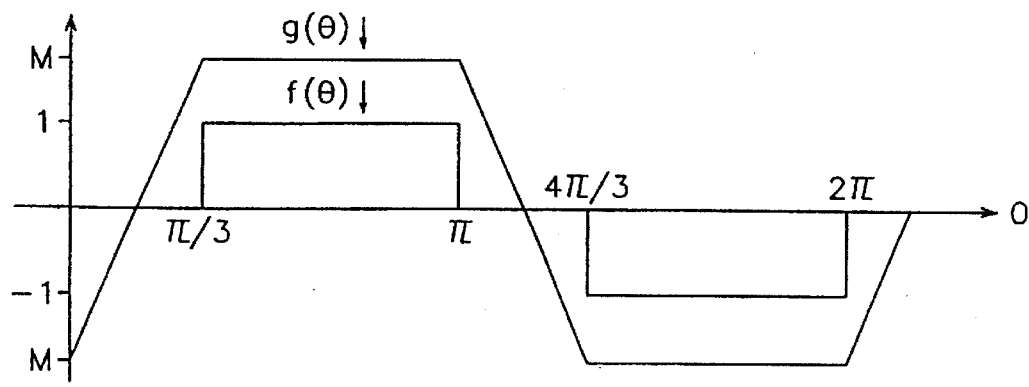
FIGS. 3A-3C are current wave form charts for trapezoidal reverse electromotive force in a brushless DC motor.
Figure 3B:
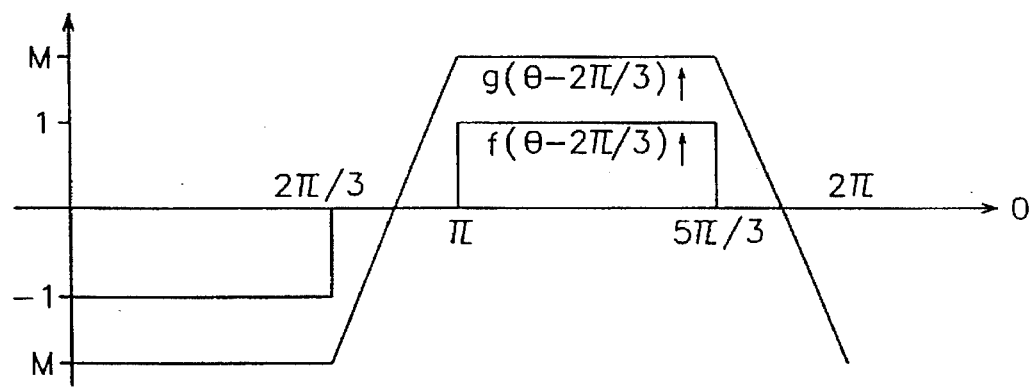
Figure 3C:
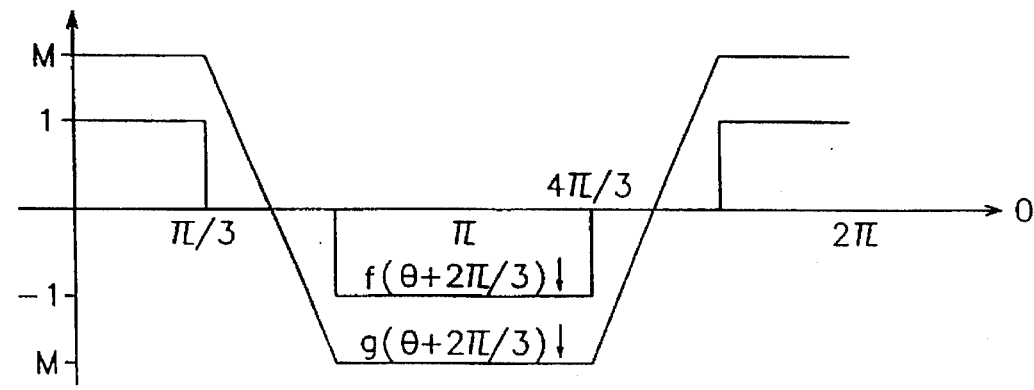
Figure 4:
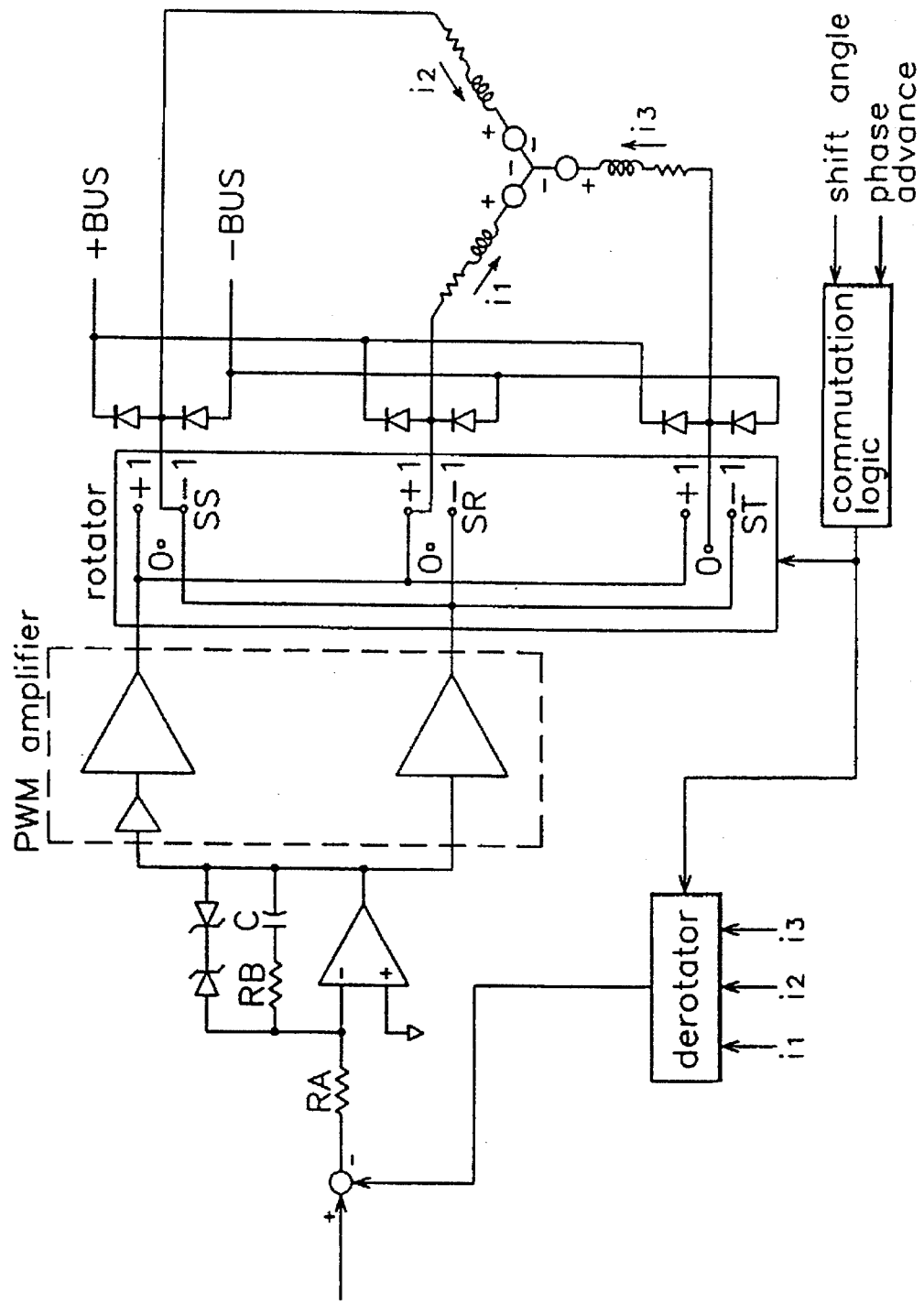
FIG. 4 is circuit diagrams of a current control circuit and an inverter circuit embodying the torque control method for brushless DC motor.
Figure 5A:
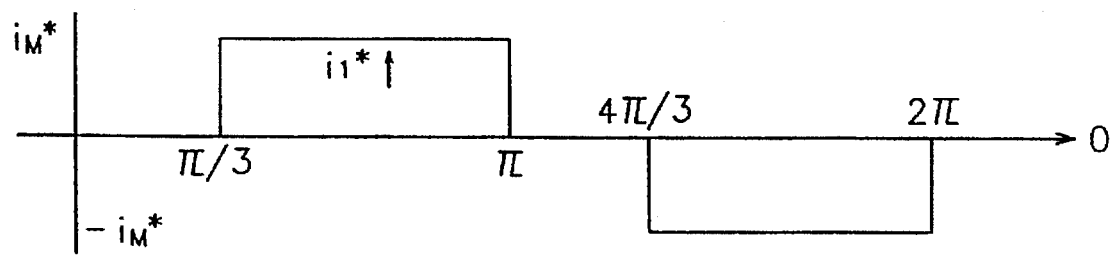
FIGS. 5A-5C are current wave form charts embodying the torque control method for a brushless DC motor.
Figure 5B:
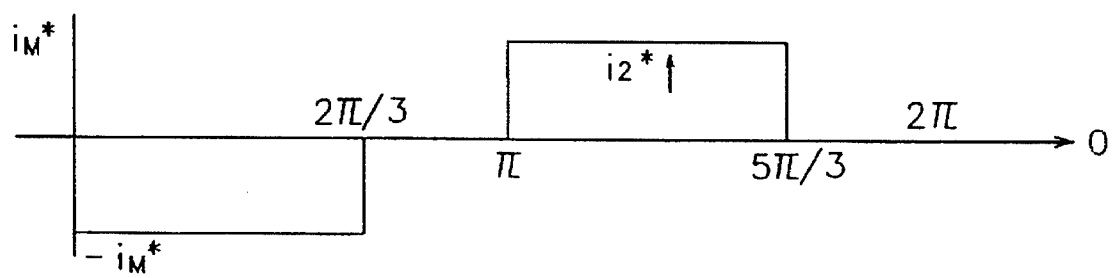
Figure 5C:
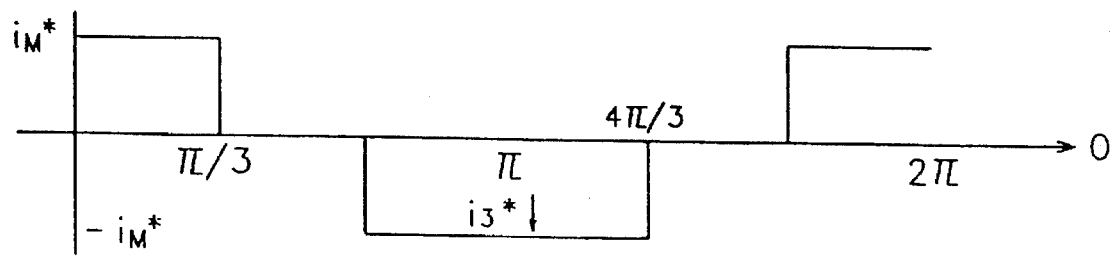
Figure 6A:
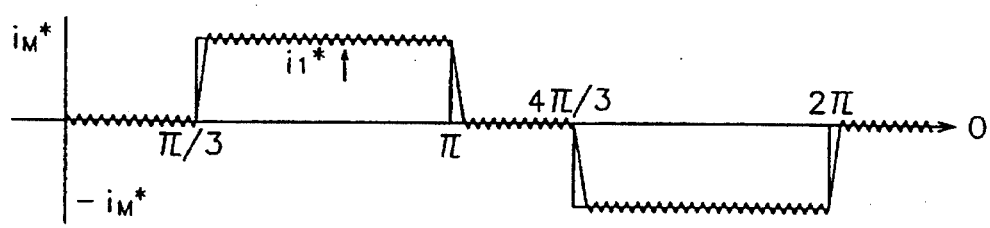
FIGS. 6A-6D are wave form charts illustrating an actual current command and a torque wave form of a brushless DC motor.
Figure 6B:
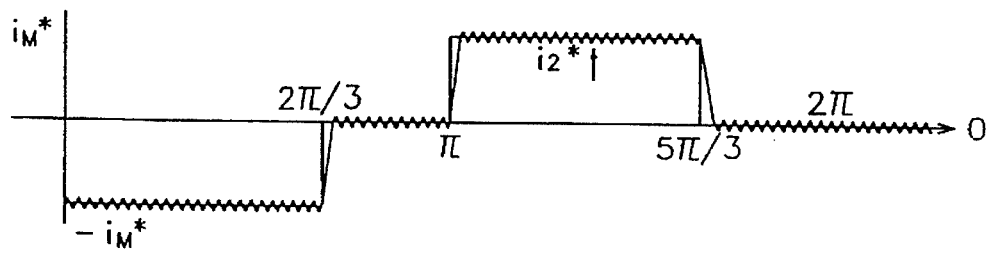
Figure 6C:
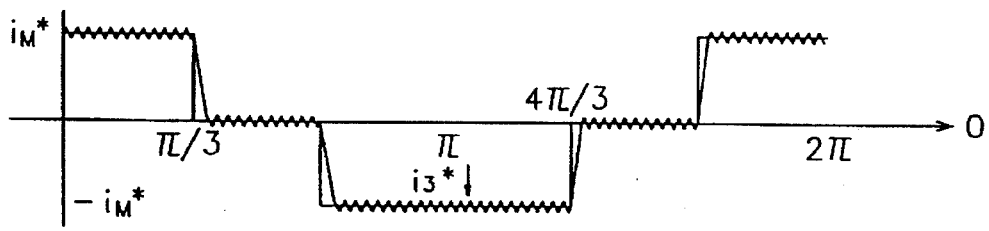
Figure 6D:
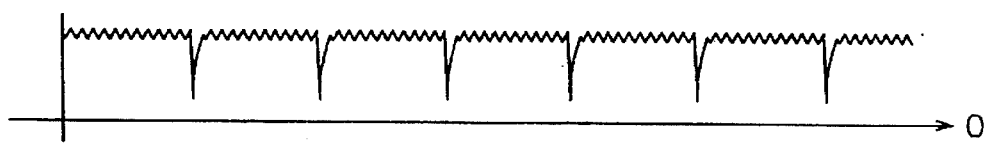
Figure 7:
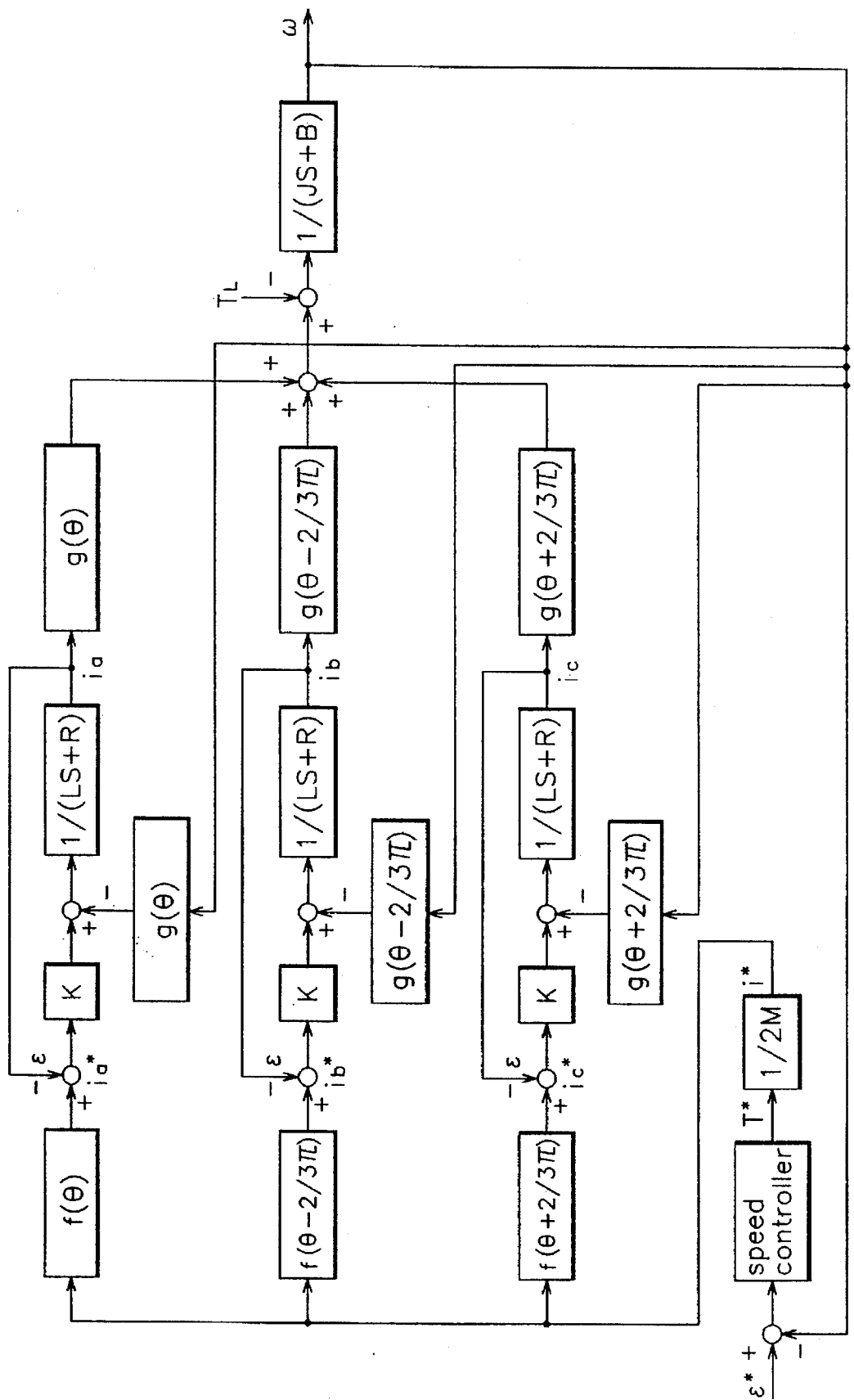
FIG. 7 is a block diagram illustrating a system including position and speed controllers for controlling a brushless DC motor.

Reference will now be made in detail to the preferred embodiments of the invention, examples of which are illustrated in the accompanying drawings.

In controlling the torque according to a preferred embodiment of the present invention, a current command, which is a continuous function and minimizes the torque ripple, is realized using the Fourier series under a supposition that the actual current closely follows the command.

$$T=g(\theta)i_1+g(\theta-2/3\pi)i_2+g(\theta+2/3\pi)i_3 \tag{101}$$

Supposition: The wiring forms of the poles of the motor are symmetrical to one another, and the magnetic flux of the rotor is distributed symmetrically to the Pole Axes.

Generally, the supposition is as follow;

Since $g(\theta)$ is a periodic function having a period of $2\omega$, it can be expanded for $\theta$ by the Fourier series, and since $g(\theta)$ is an odd function, a cosine term does not exist. According to the supposition, a harmonic term of every even multiple of $\theta$ does not exist.

$$g(\theta)=E_1\sin\theta+E_3\sin3\theta+E_5\sin7\theta+ \tag{102}$$

Since the current command is also the periodic function, it can be expanded by the Fourier series, and since the sum of current of the three phases is zero, a term of sin $(3n\theta)$ does not exist.

$$i_1^*=i_M^*f_1(\theta)=i_1^*(I_1\sin\theta+I_5\sin5\theta+I_7\sin7\theta+I_{11}\sin11\theta---) \tag{103}$$

If the equations (102) and (103) are multiplied to the torque of one phase, $$T_1=g(\theta)i_1^* =i_M^*(P_0+P_2\cos2\theta+P_4\cos4\theta+P_6\cos6\theta+---) \tag{104}$$

And for other phases, $$T_2=g(\theta-2/3\pi)i1^*(\theta-2/3\pi) \tag{105}$$

$$T_3=g(\theta+2/3\pi)i1^*(\theta+2/3\pi) \tag{106}$$

When the equations (104), (105) and (106) are added, only the harmonic term of a multiple of 6 remains.

$$T=T_1+T_2+T3 =T_0+T_6\cos6\theta+P_4\cos4\theta+T_{12}\cos12\theta+--- \tag{107}$$

where, $$T_0=1.5i_M^*[E_1I_1+E_5I_5+E_7I_7+E_{11}I_{11}+---]$$

$T_6=1.5i_M*[I_1(E_7-E_5)+I_5(E_{11}-E_1)+I_7(E_1-E_{13})+I_{11}(E_5-E_7)+\cdots]$ $T_{12}=1.5i_M*[I_1(E_{13}-E_{11})+I_5(E_{17}-E_7)+I_7(E_{19}-E_5)+I_{11}(E_{23}-E_1)+\cdots]$ $T_{18}=1.5i_M*[I_1(E_{19}-E_{17})+I_5(E_{23}-E_{13})+I_7(E_{25}+E_{11})+I_{11}(E_{29}-E_7)+\cdots]$ $T_{24}=1.5i_M*[I_1(E_{25}-E_{23})+I_5(E_{29}-E_{19})+I_7(E_{31}+E_{17})+I_{11}(E_{35}-E_{13})+\cdots]$ Let us ignore terms over $E_{15}$ in the equation (102). $I_5$ and $I_7$ are obtained to make the terms of $T_0$ and $T_{12}$ zero.

$$(E_{11}-E_1)I_5+(E_1+E_{13})I_7=(E_5-E_7)I_1 \quad (108)$$

$$E_7 I_5+E_5 I_7=(E_{13}-E_{11})I_1 \quad (109)$$

If the equations (108) and (109) are solved, $$I_5 = \frac{I_1[E_5(E_5-E_7)-(E_1+E_{13})(E_{13}-E_{11})]}{[E_5(E_{11}-E_1)-E_7(E_1+E_{13})]} \quad (110)$$

$$I_7 = \frac{I_1[E_7(E_5-E_7)-(E_{11}+E_1)(E_{13}-E_{11})]}{[E_7(E_1+E_{13})-E_5(E_{11}-E_1)]} \quad (111)$$

Following definitions are made.

$$G_5 = \frac{[E_5(E_5-E_7)-(E_1+E_{13})(E_{13}-E_{11})]}{[E_5(E_{11}-E_1)-E_7(E_1+E_{13})]} \quad (112)$$

$$G_7 = \frac{[E_7(E_5-E_7)-(E_{11}+E_1)(E_{13}-E_{11})]}{[E_7(E_1+E_{13})-E_5(E_{11}-E_1)]} \quad (113)$$

A last current command for removing the torque ripples, $T_6$ and $T_{12}$ is expressed in a following equation (114).

$$i_1^* = i_1^*I_1(\sin\theta + G_5\sin5\theta + G_7\sin7\theta) \quad (114)$$

A last torque in which the ripple is removed, $$T=1.5 i_M^* I_1(E_1+E_5 G_5+E_7 G_7)+T_{18}\cos18\theta+T_{24}\cos24\theta+\cdots \quad (115)$$

There is no problem since terms of $T_{18}$ and $T_{24}$ having enough high frequency filtered out by the low pass filter by the general inertia of the rotor according to the equation (115).

Figure 8:
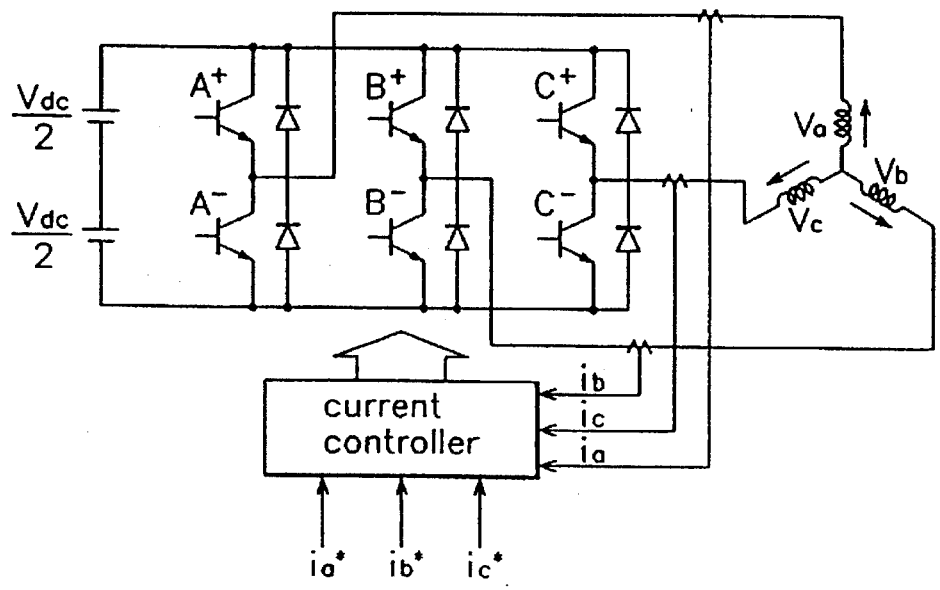
FIG. 8 is a circuit diagram of an inverter according to the invention employing a pulse width modulation method of a current control type of a brushless DC motor.

FIG. 8 is a view of basic circuit of an inverter of current control pulse width modulation type having as a load a three-phase brushless DC motor. It is not preferable to operate a power amplifier for supplying current to a motor in a linear area due to excessive power consumption of a power transistor. Thus, the power transistor is operated in a switching area to decrease the power consumption, such that the power consumption can be minimized. This is called a pulse width modulation inverter method.

Current command of each phase is sequentially compared with actual current, and an operation signal of the transistor is produced through a current controller. Referring to FIG. 8, provided a current command vector is i* and an actual flowing current vector is i, current and voltage components are represented on a complex plane as shown in FIG. 8. At this time, a current error vector, $\Delta i$ can be obtained by a following equation 116.

$$\Delta i = i^* - i \quad (116)$$

Accordingly, using the output voltage vectors $V_1$ to $V_8$ (see FIG. 9), the actual current vector i is made to follow the current command vector i*, and the current is controlled.

Figure 9:
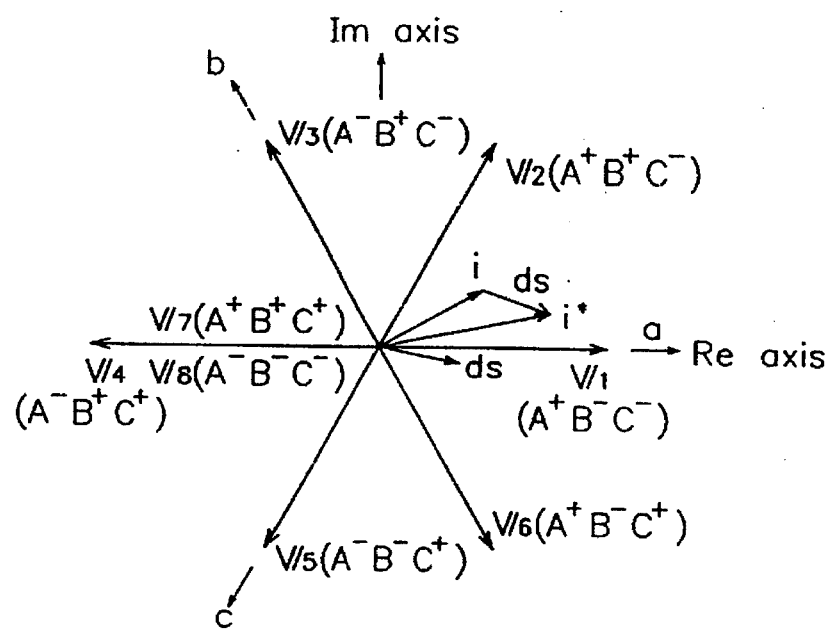
FIG. 9 is a vector diagram of voltage and current in a complex plane applied to the inverter of FIG. 8 according to a pulse width modulation method of a current control type for a brushless DC motor.

FIG. 9 is a view of current vector and an axis of coordinates of three phases on the complex plane.

The current errors $\Delta i_a$, $\Delta i_b$, and $\Delta i_c$ of each phase can be expressed by projecting the current error vector $\Delta i$ on each phase. Meantime, an output vector of the PWM inverter having a value of zero of $\Delta i$ in the equation 116 is selected to make the actual current to follow the current command. But since the actual output signal is discretely produced, it is impossible to make the value of $\Delta i$ to be zero. Therefor, a certain permissible range in the current error vector is defined, and the voltage vector is selected to make the current error vector be in the permissible range.

Methods for selecting the voltage vector, that is, methods for controlling current are generally classified into hysteresis control methods and sawtooth wave comparison methods.

Figure 10A:
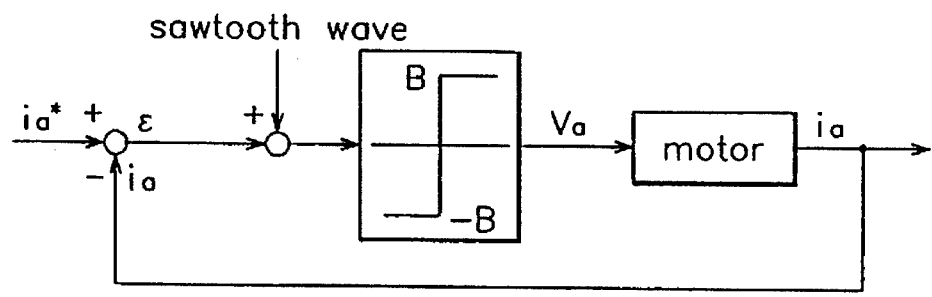
FIG. 10A is a block diagram and FIGS. 10B and 10C are waveform charts illustrating a principle by which a pulse width modulation signal by a sawtooth wave comparison method is produced.
Figure 10B:
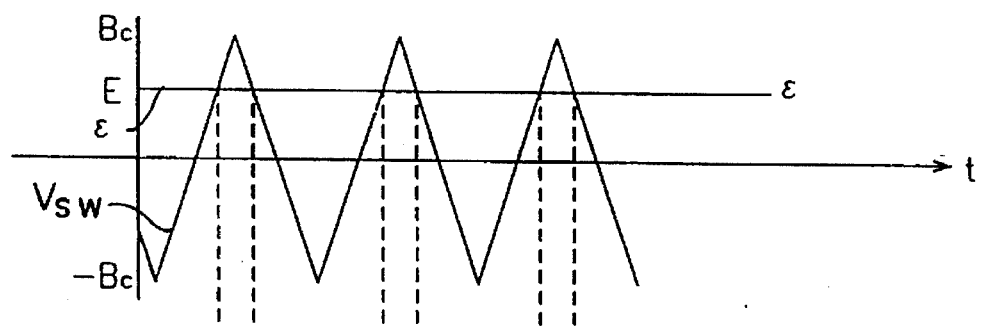
Figure 10C:
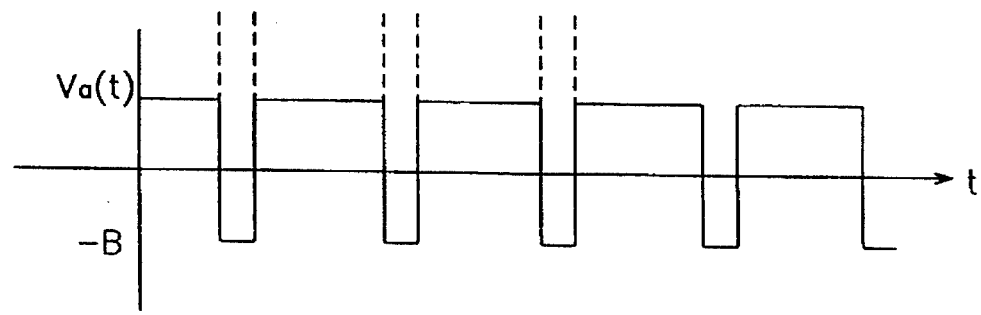

In the sawtooth wave comparison method, the current error signal is compared with the sawtooth wave, and the PWM signal is produced. A high gain controller results from the sawtooth wave comparison method, and a ground for this is as follows;

Referring to FIGS. 10A–10C, the current error signal is constant as E, voltage $V_a(t)$ (FIG. 10C) applied to the motor is a periodic function having a constant frequency of the sawtooth ($V_{sw}$, FIG. 10B) wave. If $V_a(t)$ is developed in Fourier series, it is expressed as a following equation 117.

$$V_a(t) + A_0/2 + \sum_{n=1}^{\infty}(A_n\cos2n\pi t/T + B_n\sin2n\pi t/T) \quad (117)$$

where, $$A_o = 2/T \int_o^T V_a(t)dt = 2B\,E/B_c = 2/T \int_o^T V_a(t)\cos2n\pi t/T dt$$

$$= \frac{2B}{n\pi}\sin\{n\pi(E/B_c+1)\}$$

When the frequency (1/T=f) of the sawtooth wave is set to be enough greater than a time constant of the motor, and a high frequency component is removed by the inertia of the motor, a transmission function of the sawtooth wave comparison method is represented as a following equation (118).

$$\frac{V_a(t)}{e(t)} = \frac{B}{B_c} \quad (118)$$

Accordingly, when B is great enough, it becomes the high gain controller.

Figure 11:
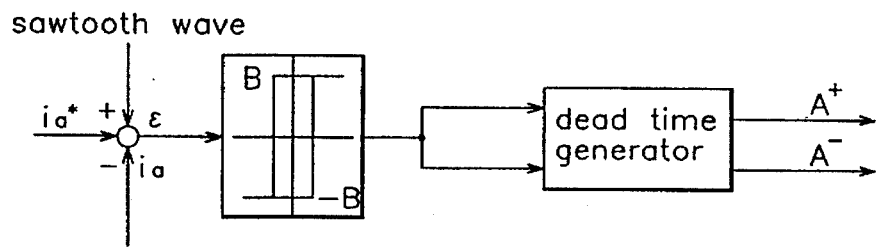
FIG. 11 is a block diagram of a current controller for sawtooth wave comparison method of a brushless DC motor.

A dead time longer than a turning OFF period of a switching element is generated to prevent two switching elements from turning ON for one phase at the same time, and a hysteresis width is established, considering a noise produced when inputted to a comparator. FIG. 11 is a block diagram of the sawtooth wave comparison method actually embodied.

Figure 12:
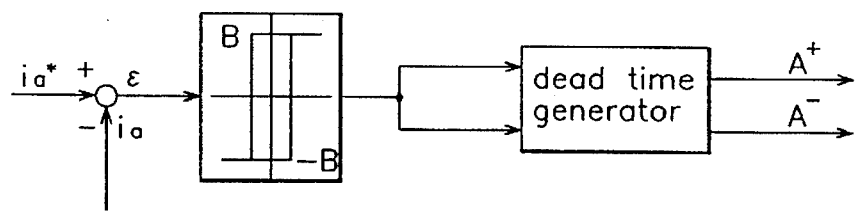
FIG. 12 is a block diagram of a current controller for a hysteresis method in a brushless DC motor.

Referring to FIG. 12, in the hysteresis method, the current error signal is not compared with the sawtooth wave, and directly transmitted to the comparator and then the PWM signal is produced. The hysteresis method is easier than the sawtooth wave comparison method in the embodiment, and the actual current in the hysteresis method rather than in the sawtooth wave comparison method follows the current command better.

However, a switching frequency is not constant and lots of noise is produced. Likewise, in the sawtooth wave comparison method, the actual current has a ripple by establishing the hysteresis width and the dead time generator in the comparator. Since such the ripple has a high frequency, it is supposed that the ripple may be easily removed by the time constant of the motor.

Figure 13:
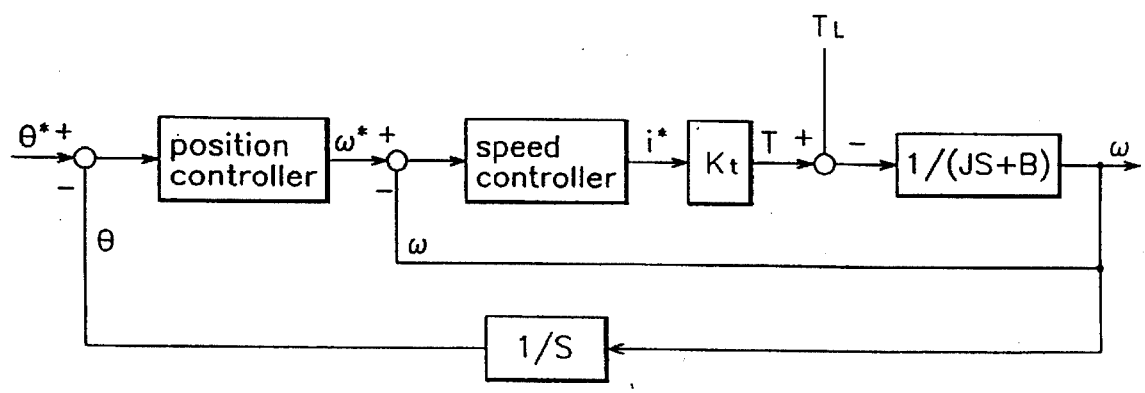
FIG. 13 is a block diagram illustrating position and speed controllers of a brushless DC motor when current is completely controlled.

Accordingly, the response speed of the motor becomes speedy, and the speed control becomes easier. Referring to FIG. 13, the system for controlling a brushless DC motor can be illustrated without considering resistance and inductance of the motor when the above-mentioned hysteresis current controller is applied to the three phases a, b, and c. Then, the entire system becomes a linear system, such that a user can easily analyze the system.

Figure 14:
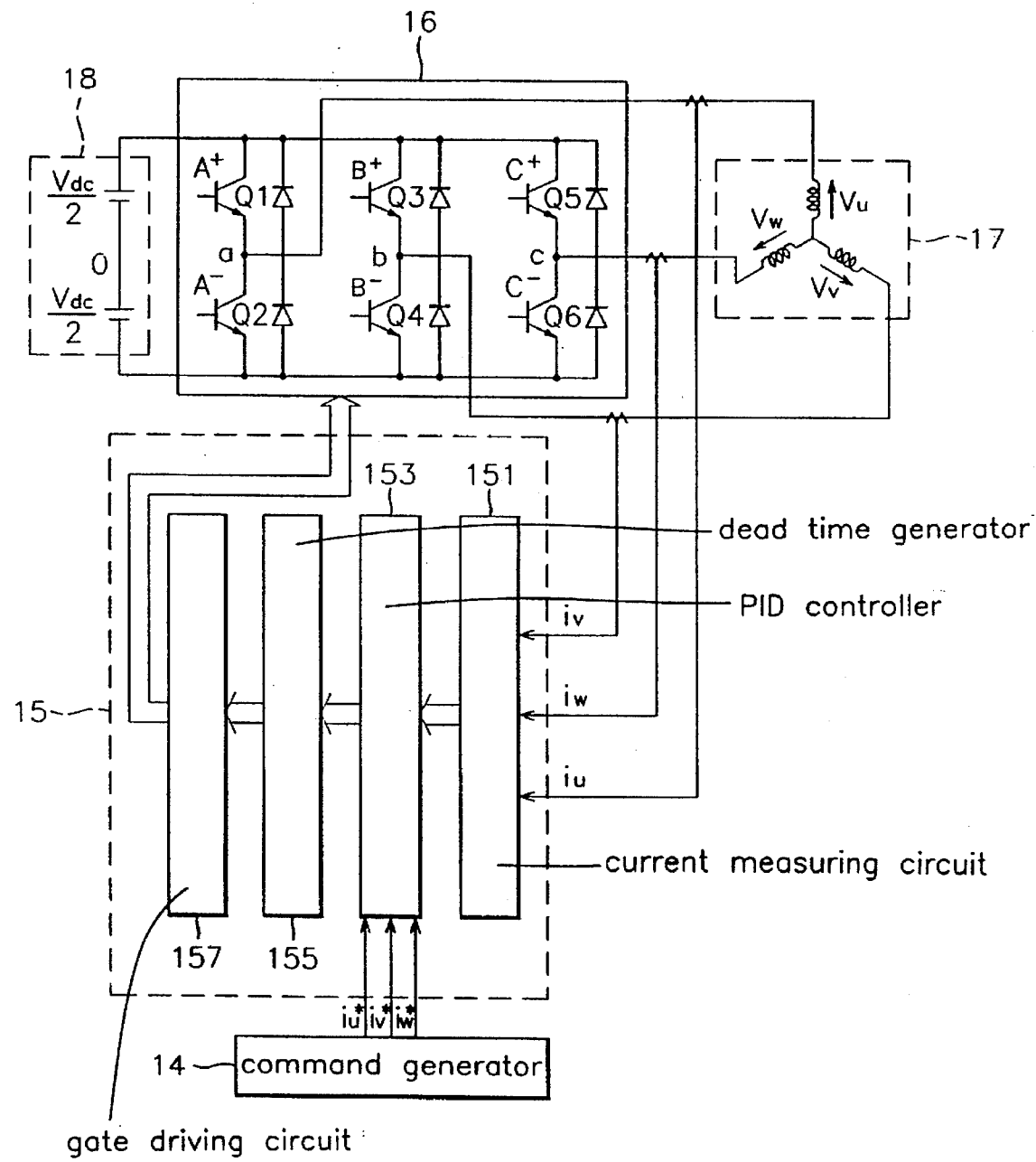
FIG. 14 is a schematic and circuit diagram of a system for controlling a brushless DC motor according to a preferred embodiment of the present invention.

Referring to FIG. 14, the system for controlling a brushless DC motor in the preferred implementation includes a current command generator 14, a current controller 15, an inverter circuit 16, three-phase coils 17, and a power supply unit 18.

The current controller 15 includes a current measuring circuit 151, a proportional integral differential controller 153, a dead time generator 155, and a gate driving circuit 157.

Three phases are represented by a, b and c phases respectively (FIG. 8), and by u, v and w phases (FIG. 14).

Figure 19:
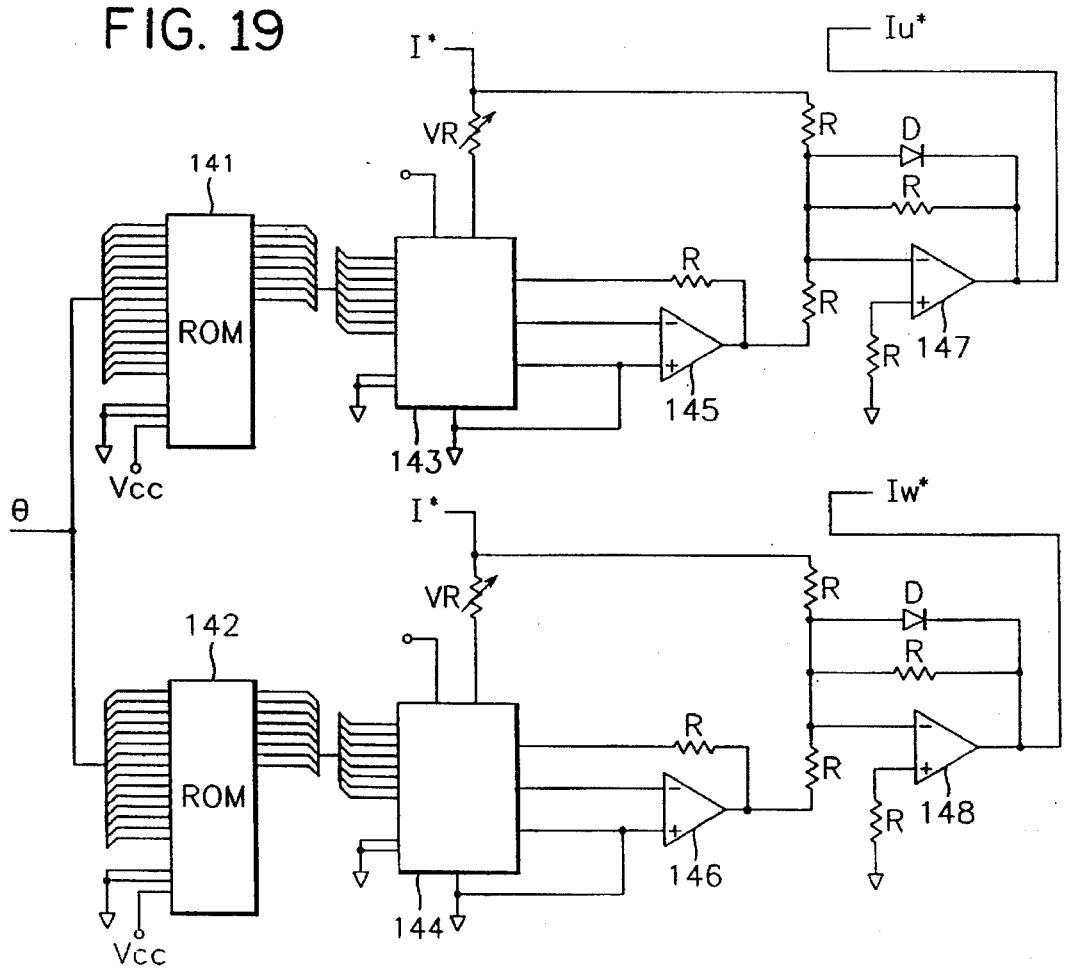
FIG. 19 is a detailed circuit diagram illustrating the current command generator in the system of FIG. 14.

Referring to FIG. 19, the current command generator 14 is for generating current commands $I_u^*$, $I_v^*$ of phases u and w from position information θ. Data for wave forms of the current commands is memorized in a mapping method in ROMs 141, 142. When the position information θ is input, data of f(θ) is produced from the ROM 141 and data of f(θ+2/3π) is produced.

Functions f(θ) and f(θ+2/3π), the wave form data of the current command produced from the ROMs 141, 142, are converted into analog signals by multi digital/analogue converters 143, 144, and multiplied by a torque command I* corresponding to a size of the current command by operational amplifiers 145, 146, thus producing phase current commands. The operational amplifiers 147, 148 connected to output terminals of the multi digital/analog converters 143, 144 are for obtaining bipolar output signals.

The phase current commands, $I_u^*$ and $I_w^*$ produced from the operational amplifiers 147, 148 are input into the PID controller 153 in the current controller 15 as shown in FIG. 14.

Figure 15:
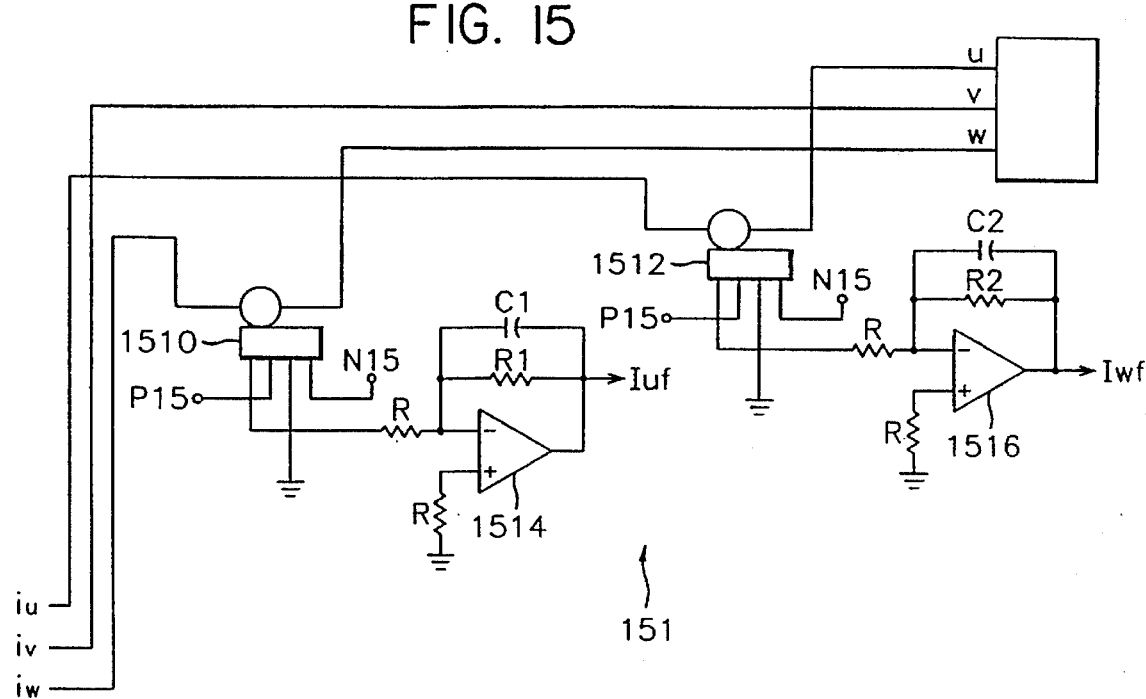
FIG. 15 is a detailed circuit diagram illustrating the current measuring circuit in the system of FIG. 14.

The operation of the current measuring circuit 151 will be described in connection with FIG. 15. The current measuring circuit 151 measures current actually flowing in the u and w phases of the motor. The current measuring circuit 151 includes current transducers 1510, 1512, and a low-pass filter having the operational amplifiers 1514, 1516, resistors R, R1, R2 and condensers C, C1, C2.

The current transducers 1510, 1512 are for detecting the amount of current flowing in the u and w phases of the motor. Noise in the low frequency area, included in the detected amount of current, can be removed by the low-pass filter having the operational amplifiers 1514, 1516, the resistors R, R1, R2 and the condensers C, C1, C2.

A bandwidth of a pass band may be controlled by properly selecting an element value of the resistor R42 and the condenser C40, or the resistor R45 and the condenser C41, in the low-pass filter.

Figure 16:
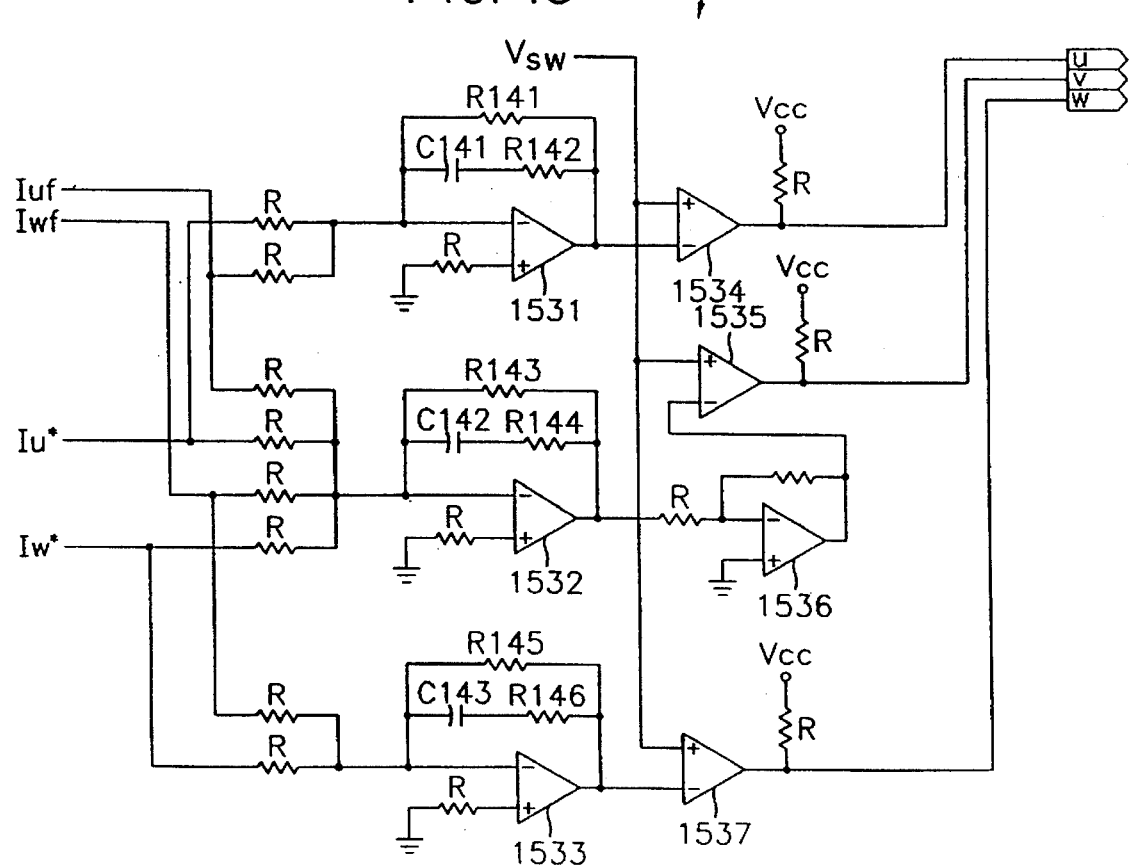
FIG. 16 is a detailed circuit diagram illustrating the PID controller in the system of FIG. 14.

FIG. 16 is a detailed circuit diagram of PID controller 153 which receives the output signals $I_{uf}$, $I_{wf}$ of the current measuring circuits 151 and the output signals $I_u^*$, $I_w^*$ of the current command generator 14. The PID controller 153 is for producing output pulses u, v, and w of three phases after receiving the current commands $I_u^*$, $I_w^*$ of the u and w phases and current feedback $I_{uf}$, $I_{wf}$. The v phase can be synthesized from the current commands $I_u^*$, $I_w^*$ of the u and w phases and current feedback $I_{uf}$, $I_{wf}$ using the operational amplifier 1532.

Gain values of the operational amplifiers 1531, 1533, 1536 may be controlled by properly selecting the element values of the resistors R141, R142 and the condenser C141, or the resistors R 143, R144 and the condenser C142, or the resistors R145, R146 and the condenser C143. The operational amplifier 1531 is for the u phase, the operational amplifier 1536 is for the v phase, and the operational amplifier 1533 is for the w phase. The input signals are proportionally integrated and differentiated by the operational amplifiers 1531, 1533, 1536.

Voltage produced from the operational amplifiers 1531, 1533, 1536 is inputted into the operational amplifiers 1534, 1535, 1537 serving as a comparator, and a pulse width of the voltage is converted and produced. A sawtooth wave is applied as a reference voltage to a non-inverting input terminal of the operational amplifiers 1534, 1535, 1537.

The output voltages u, v, w of the operational amplifiers 1534, 1535, 1537 serving as the comparator are input to the dead time generator 155.

Figure 17:
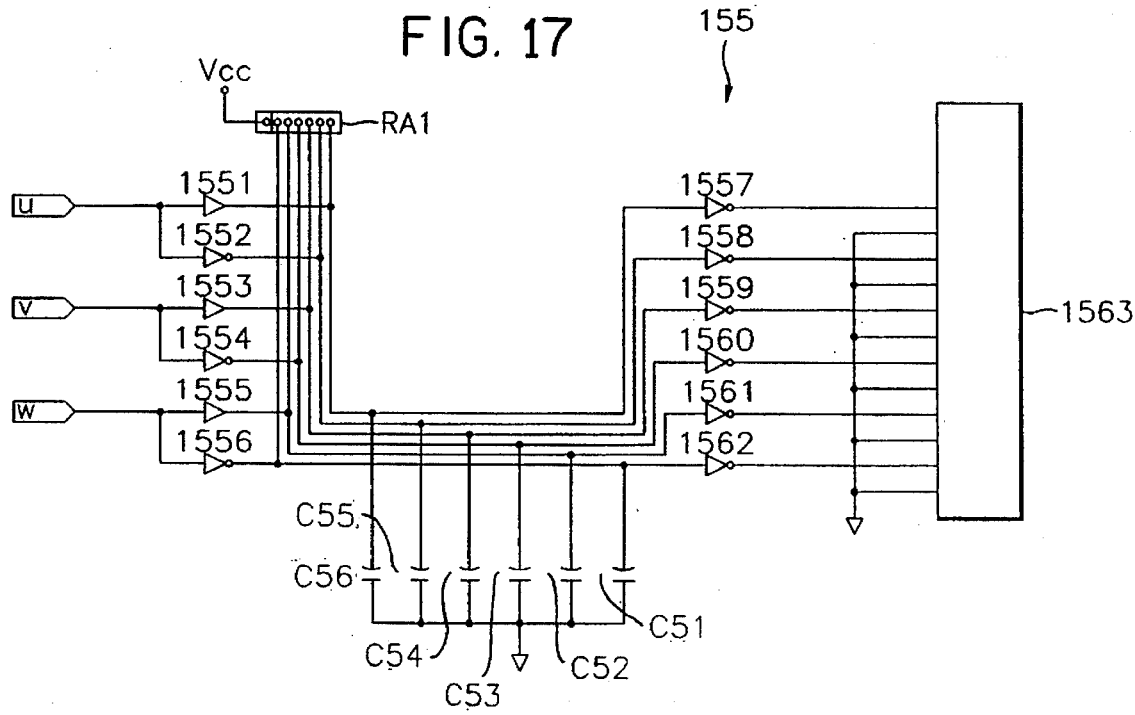
FIG. 17 is a detailed circuit diagram illustrating the dead time generator in the system of FIG. 14.

FIG. 17 is the detailed circuit diagram of the dead time generator 155. The dead time generator 155 is for producing a real ON/OFF signal of a power transistor in the inverter circuit 16 from three-phase output signals of pulse width modulation produced from the operational amplifiers 1534, 1535, 1537 in the PID controller 153. The dead time generator 155 allows a dead time to avoid turning ON/OFF of upper and lower terminals of the power transistor of one phase at the same time.

The dead time is made by a combination of the elements values of a resistor RA1 and the condensers C51 to C56, and the size of the dead time is as follow;

$$t_d = RA1 \times C51$$

That is, after the signals input to the dead time generator 155 pass through the amplifiers 1551, 1553, 1555 or inverters 1552, 1554, 1556, the dead time is formed by the resistor RA1 and the condensers C51 to C56. The signals are input to a connector 1563 after passing through inverters 1557 to 1562, and are transmitted to a gate driving circuit 157.

Figure 18:
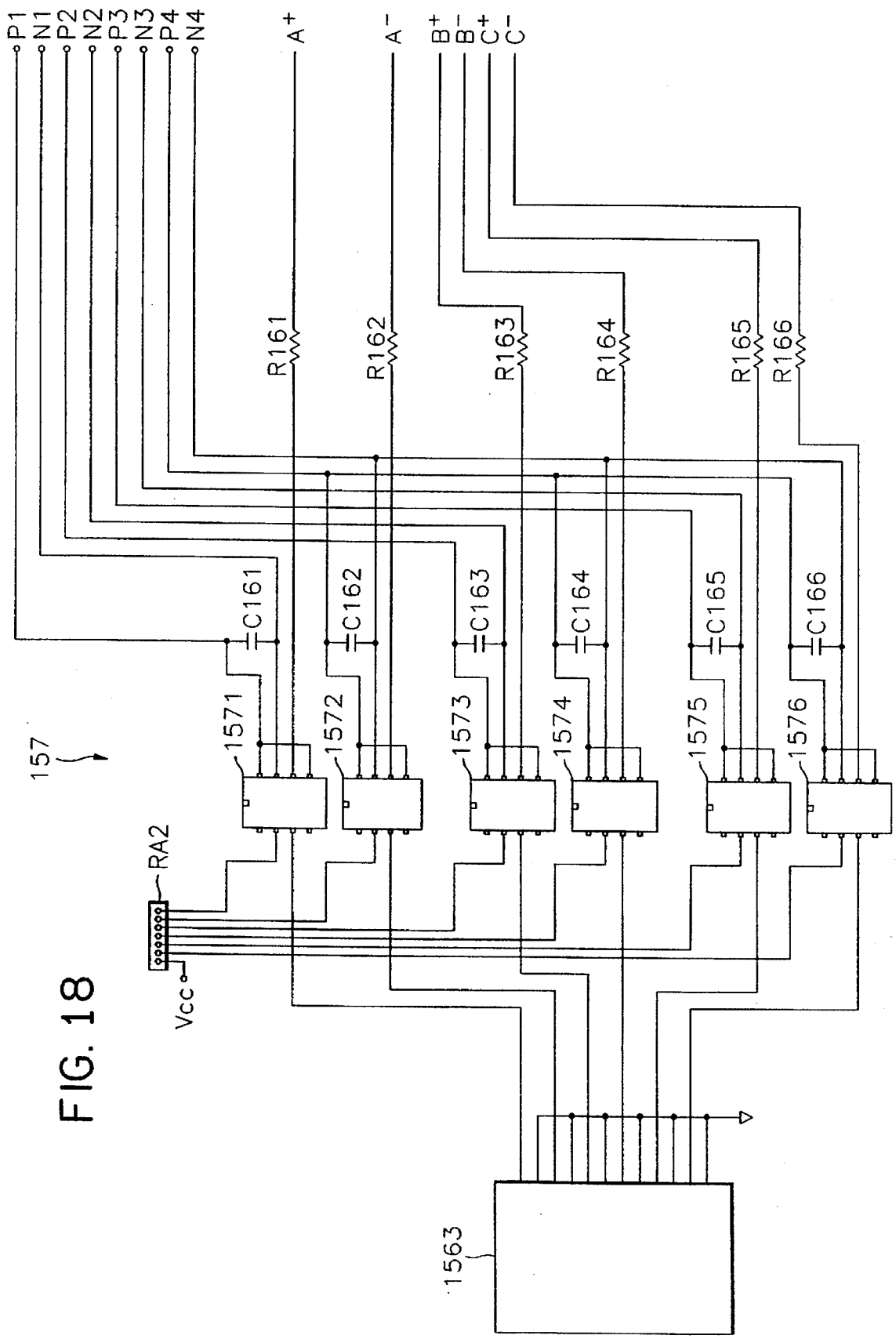
FIG. 18 is a detailed circuit diagram illustrating the gate driving circuit in the system of FIG. 14.

FIG. 18 is the detailed circuit diagram of the gate driving circuit 157 which receives an output signal of the connector 1563. The gate driving circuit 157 controls the ON/OFF signal of the power transistor received from the dead time generator 155 applied to base terminals of the power transistors Q1 to Q6 in the inverter circuit 16 as shown in FIG. 12.

That is, the signal produced from the connector 1563 of the dead time generator 155 is processed as a signal by a photocouplers 1571 to 1576 having built-in amplifiers, passes through resistors R161 to R166 connected to the photocouplers 1571 to 1576, and is applied to the base terminals of the power transistors Q1 to Q6 in the inverter circuit 16. HCPL 3101 is used as the photocouplers 1571 to 1576 having the built-in amplifiers in the preferred embodiment of the present invention, but a technical scope of the present invention is not limited to this.

The speed of turning ON/OFF of the base terminals of the transistors Q1 to Q6 in the inverter circuit 16 may be controlled by properly selecting element values of the resistors R161 to R166 connected to output terminals of the gate driving circuit 157. In addition, power P1 to P4 and N to N4 applied to condensers C161 to C166 connected to the photo couplers 1571 to 1576 is for producing a voltage level which drives the base terminals of the transistors Q1 to Q6.

Each output signal A+, A−, B+, B−, C+ and C− of the gate driving circuit 157 is applied to each base terminal of the power transistors Q1 to Q6 of the inverter circuit 16, and the voltage of the power supply unit 18 is applied to the three-phase coils according to ON/OFF operation of each power transistor Q1 to Q6.

The current amount applied to the three-coils 17 according to the ON/OFF timing of the power transistors Q1 to Q6 is changed, thereby the torque ripple of the motor can be minimized.

According to a principle of the present invention, the torque ripple is minimized, and thereby the minute vibration of the motor and the loading device can be reduced. In addition, the follow efficiency of the motor after the speed command be enhanced, and more accurate speed control can be possible.

It will be apparent to those skilled in the art that various modifications and variations can be made in the camera and method of the present invention without departing from the spirit or scope of the invention. Thus, it is intended that the present invention cover the modifications and variations of this invention provided they come within the scope of the appended claims and their equivalents.

What is claimed is:

1. A system for controlling a brushless DC motor, comprising, first means for producing a current command signal by multiplying data representing a wave form of the current command signal in one-to-one correspondence with position information by a selected peak amplitude of the current command signal;

second means for controlling actual current in the motor to follow the current command signal produced from said first means by a feedback error correction signal including proportional, integral, and differential elements, said feedback error correction signal having a bi-level output for turning current ON or OFF, the second means including a sawtooth comparator providing the proportional element as a relatively high-gain element, and including means for providing dead time in the feedback error correction signal of an amount such that some high frequency ripple is not responded to in the feedback error correction signal; and third means for controlling switching elements to be turned ON/OFF by the feedback error correction signal produced from said second means and for passing a desired amount of correction current to be applied to three-phase coils in the motor by a power supply unit.

2. The system for controlling a brushless DC motor according to claim 1, wherein said first means includes:

a ROM storing the data representing the wave form of the current command;

means for converting the data representing the wave form of the current command signal produced from said ROM into an analogue signal;

means for multiplying the data representing the wave form of the current command signal produced from said converting means by the selected peak amplitude of the current command; and means for amplifying a product signal from said multiplying means to a bipolar output signal.

3. The system for controlling a brushless DC motor according to claim 1, wherein said second means includes:

means for detecting actual current amount flowing in the three-phase coils in the motor;

means for comparing the detected current amount to the current command signal to produce the feedback error correction signal;

the means for providing dead time including means for connecting with upper and lower terminals of a power transistor of one phase in said third means to provide that said upper and lower terminals are not concurrently turned ON; and said third means including means for boosting an output signal produced from said providing means to a voltage level for applying to a base terminal of said power transistor.

4. The system for controlling a brushless DC motor according to claim 3, wherein said detecting means includes:

means for detecting the amount of current flowing in u and w phases of the motor; and means for removing noise in a range of low frequency of the current detected in u and w phases of the motor.

5. The system for controlling a brushless DC motor according to claim 4, wherein said means for removing noise comprises a low-pass filter including a plurality of resistors and a plurality of capacitors a bandwidth of said low frequency noise can be changed by varying element values of resistors and condnesers of said noise removing means.

6. The system for controlling a brushless DC motor according to claim 3, wherein said second means for controlling actual current in the motor includes:

means for synthesizing the current command signal of the u and w phases and the current command signal of a phase v from current feedback; and means for generating the integral and differential elements of the feedback error correction signal of each phase.

7. The system for controlling a brushless DC motor according to claim 6, wherein said differential element comprises means for selecting element values of resistors and a capacitor.

8. The system for controlling a brushless DC motor according to claim 6, wherein said means for providing dead time sets a dead time by a combination of element values of a resistor and condensers.

9. The system for controlling a brushless DC motor according to claim 3, wherein said boosting means includes:

an amplifier; and means for transferring the output signal from said amplifier to a base terminal of said power transistor.

* * * * *

UNITED STATES PATENT AND TRADEMARK OFFICE
CERTIFICATE OF CORRECTION

PATENT NO.   :   5,625,264
DATED        :   April 29, 1997
INVENTOR(S)  :   Sung-jung YOON It is certified that error appears in the above-indentified patent and that said Letters Patent is hereby corrected as shown below:

Claim 5, column 14, line 30, after "capacitors", insert --.--.

Claim 5, column 14, lines 30-32, delete "a bandwith of said low frequency noise can be changed by varying element values of resistors and condnesers of said noise removing means.".

Signed and Sealed this

Ninth Day of September, 1997

Attest:

BRUCE LEHMAN

Attesting Officer

Commissioner of Patents and Trademarks